Oct. 23, 1923.
M. H. RIECKMANN
COFFEE EXTRACTOR
Filed March 28, 1923
1,471,752
2 Sheets—Sheet 1
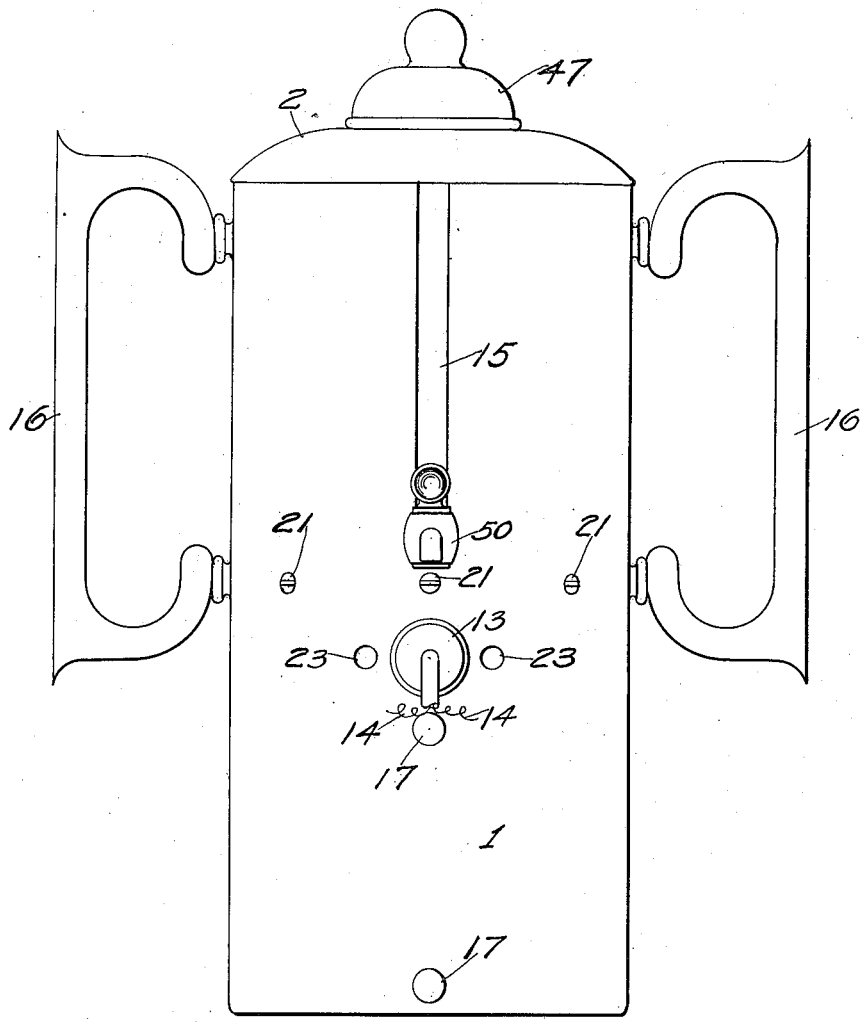
Fig. I.
Max H. Rieckmann, INVENTOR.
BY
Frank A. Cutter, ATTORNEY.

Oct. 23, 1923.

M. H. RIECKMANN 1,471,752

COFFEE EXTRACTOR

Filed March 28, 1923     2 Sheets-Sheet 2

INVENTOR.
Max H. Rieckmann,

BY
Frank A. Cutter,
ATTORNEY.

Patented Oct. 23, 1923.

1,471,752

UNITED STATES PATENT OFFICE.

MAX H. RIECKMANN, OF HOLYOKE, MASSACHUSETTS.

COFFEE EXTRACTOR.

Application filed March 28, 1923. Serial No. 628,181.

*To all whom it may concern:*

Be it known that I, MAX H. RIECKMANN, a citizen of the United States of America, and a resident of Holyoke, in the county of Hampden and State of Massachusetts, have invented a new and useful Coffee Extractor, of which the following is a specification.

My invention relates to improvements in appliances for preparing infusions of coffee, and consists generally of an outer receptacle within which an electric motor and an electric heater are installed, an inner, removable receptacle for water and the infusion, said second-named receptacle being provided with a draw-off faucet, a hollow column or tube in said second-named receptacle through which tube the motor shaft extends, a break-water member in said second-named receptacle, a coffee receptacle and a hollow-walled, water actuator mounted on and rotatably connected with said shaft, in said second-named receptacle, said last-named receptacle having perforated sides, and said actuator also having perforated sides, and the same being removable with said last-named receptacle from said shaft and second-named receptacle, a cover or lid for said last-named receptacle, and a cover or lid for said first- and second-named receptacles, all of novel construction or combined and arranged in a novel manner, together with the necessary electric switch and connections, and such other parts and members as may be necessary or desirable in order to render the appliance or extractor complete in every respect, all as hereinafter set forth.

The primary object of my invention is to produce a comparatively simple and thoroughly sanitary coffee extractor with which a quick and complete infusive action is obtained, to the end that the resulting beverage contains practically all of the flavor without the objectionable narcotic ingredient. Ground coffee is, of course, used in the extractor, and the extraction of the essentials of the coffee is so complete as to render said extractor very economical.

Another object is to provide a coffee extractor of this character which can be easily and quickly taken apart and put together again, and is convenient to use.

In this appliance, the water after being heated (boiled) is elevated and discharged or sprayed into the cup containing the ground coffee, which cup is revolving rapidly. The hot water thus sprayed into the coffee is thoroughly commingled therewith throughout the entire mass, with the result that complete extraction of the desired ingredients of the coffee is effected, and the resulting infusion is discharged from the cup into the receptacle from which the hot water was primarily drawn, where said infusion remains in readiness to be drawn off at will into outside cups, containers, or receptacles.

Other objects and advantages will appear in the course of the following description.

I attain the objects and secure the advantages of my invention by the means and mechanism illustrated in the accompanying drawings, in which—

Figure 1 is a side elevation of a coffee extractor which embodies a practical form of my invention; Fig. 2, a central, vertical section through said extractor, taken at right angles to the extractor as viewed in the first view; Fig. 3, a side elevation of the actuator screw; Fig. 4, a bottom plan of said screw and the attached handle and rod; Fig. 5, a cross section through the perforated cylinder within which the major portion of said screw is enclosed; Fig. 6, a top plan of the cup with its cover locked in place thereon, parts of the actuator handle and rod carried thereby being in section, and, Fig. 7, a bottom plan of the breakwater member.

Similar reference characters designate similar parts throughout the several views.

As clearly shown in the first two views, the coffee extractor comprises an outer receptacle or casing 1, for which is provided a lid 2, an inner receptacle or boiler 3 in the upper part of said casing, as a cover for which boiler said lid also serves, a tube 4 rising from the bottom of said boiler in the center, said tube having at the base a flange 48 that is secured to said bottom, an electric motor 5 in the bottom of said case, an electric heater 6 below said boiler in the same compartment with said motor, a break-water member 7 in said boiler, a shaft 8 which extends upwardly from said motor through said heater and said bottom of said boiler into and through said tube, a receptacle or cup 9 rigidly attached to certain elevating and discharging or distributing members which constitute an actuator and will hereinafter be described in detail, means also hereinafter to be described in detail for mounting and rotatably attaching said actuator and said cup on and to said shaft, and a lid 10 for said cup. In addition to the parts and members of which mention has just been made, there is an electric switch 11 provided with an operating knob 12, a plug 13 for wires 14 which lead from and to the source of electric supply for the extractor, and the necessary electrical connections between said plug, the motor 5 and the heater 6, and said switch.

There is a vertical slot 15 in one side of the casing 1, which slot opens through the top edge thereof, and the casing is provided with a pair of handles 16. The plug 13 is set in one side of the casing 1 and the switch 11 in the other side. Both the switch 11 and the plug 13 are of ordinary construction. The motor 5 is provided with upper and under lubricating tubes 17 which are carried in horizontal tubes 18—18 in the casing 1, the forward terminals of the former being outside of said casing. Thus the tubes 17 can be withdrawn, refilled, and replaced without difficulty. The wall inside of the casing 1 and below the boiler 3 is lined with asbestos, as represented at 19, and an asbestos tube 20 surrounds that portion of the shaft 8 which is in the compartment with the motor 5 below said boiler. The heater 6 is held in place by a plurality of screws 21, such screws passing through the casing 1 from the outside and being tapped into said heater. A wire-screen 22 is interposed between the top of the heater 6 and the bottom of the boiler 3.

There is a plurality of openings 23 in the casing 1, which openings admit air, for cooling purposes, into the space in said casing between the motor 5 and heater 6. The openings 23 and the asbestos lining 19 tend to maintain an even temperature in the lower part of the casing 1, and to prevent the temperature therein from becoming excessively hot.

The plug 13 is connected by wires 51 and 24 with the switch 11, and by a wire 25 with the heater 6, and also by said last-named wire and a wire 26 with one binding-post of the motor 5. The other binding-post of the motor is connected by a wire 27 with the switch 11, and a wire 28 connects said switch with the heater. Thus it is seen that the circuit from the plug 13, with which the wires 14 are connected, to and through the heater and back to said plug is through the wire 24, the switch 11, the wire 28, and the wires 25 and 51; and that the circuit from said plug to and through the motor and back to the plug is through said wire 24, said switch, the wire 27, the wire 26, and said wire 51.

By means of the switch and proper manipulation of the knob 12, the electric current can be turned into the heater and into the motor independently, and cut off from either or both.

The boiler 3 is provided in one side near the bottom with a faucet 50, and the inner terminal portion of said faucet is received in the slot 15 in the casing 1 when said boiler is placed in position in said casing, said slot then being closed by said faucet and boiler. When in place the upper edge of the boiler 3 is flush with the corresponding edge of the casing 1, and the lid 2 is constructed to cover said edges, and provided with a depending flange 49 to fit snugly into the upper terminal of the boiler, thus tightly closing the open ends of both the boiler and casing. The faucet 50 is for drawing off the infusion in the boiler into cups or other containers or receptacles. The boiler is provided on the inside with a water line or mark 29 that is located a short distance below the bottom of the cup 9 when in place.

The actuator, of which mention has been made, consists in the present example of a hollow lifting or elevating screw 30, the screw-threads being very coarse and on the outside, a handle 31 which fits into the upper end and over the upper edge of said screw and is rigidly secured thereto, and a hollow cylinder 32 outside of said screw and in screw-threaded engagement at the upper terminal with the base of said handle there being a plurality of small openings 33 in said cylinder. There are also four (more or less) vertical openings 34 through the flange with which the handle 31 is provided, such flange being the part that rests on top of the screw 30. The openings 34 should communicate at their lower ends with the spiral passage around the screw 30. The cylinder 32 extends downwardly through the bottom of the cup 9, but not quite to the bottom of the screw 30. The bottom of the cup 9 is provided with a downwardly-extending flange 35 which embraces and is rigidly attached to the cylinder 32, and the latter is provided with a flange 36 that rests on top of said bottom of said cup. A rod 37 is secured to the handle 31 in the axial center thereof, and extends downwardly below the base of said handle into the central passage in the screw 30. There is a vertical key-way 38 in the rod 37 which key-way opens through the lower end of said rod. Both the shaft 8 and the tube 4 extend upwardly into the central passage in the screw 30, and there is an axial opening or passage in the upper terminal of said shaft to receive the lower terminal of the rod 37. Furthermore, said shaft is provided with a pin 39 that extends into the aforesaid passage therein, and is receivable in the key-way 38. Thus the actuator with the cup 9 is supported on the shaft 8 and rotatably connected therewith. The office of the tube 4 is to protect the shaft 8 from the liquid in the boiler 3, and prevent such liquid from finding its way through the shaft opening in the bottom of said boiler, down onto the parts and members below said bottom.

There is a central opening 40 in the lid 10 to enable said lid to be placed in position on the cup 9 without interference from the handle 31. A vertical screw 41 is set in the flange of the handle 31 in position to have the head of said screw overlap the edge of the opening 40, when the lid 10 is placed over the open top of the cup 9 and actuated into engagement with said head, for the purpose of retaining said lid on said cup, even when pressure is exerted from beneath the lid. There is an extension 42 from the opening 40 large enough for the passage of the head of the screw 41, and, when the lid 10 is positioned to locate said extension in line with the head of the screw 41, the lid can be either placed on or removed from the cup 9. After the lid is placed on the cup the former is partially rotated to cause the edge of the opening 40 to pass beneath the head of the screw 41, whereby said lid is held securely on said cup. Upon partially rotating the lid on the cup to cause the extension or recess 42 to register with the screw 41, said lid can be lifted off and removed from said cup.

The lid 10 is preferably made saucer-shaped for the purpose of enabling the same to receive any of the elements that might pass upwardly through the opening 40, and permitting such elements to return through said opening to the cup 9.

There is a plurality of small holes 43 in the sides of the cup 9.

The break-water member 7 has an inner curved part 44 adapted in size and shape partially to embrace and frictionally engage the tube 4, and an outer curved part 45 adapted by size and shape frictionally to engage the wall of the boiler 3 on the inside thereof. The connecting member between the parts 44 and 45 is radial to the axis of the shaft 8, being thus positioned and held by said parts. The bottom edge of the member 7 is notched, substantially as represented at 46, in order to permit a certain amount of liquid to pass beneath said member. When the break-water member is in place, it is located just above the flange 48.

When the lid 2 is removed the cup 9 can be taken out of the boiler 3, by grasping the handle 31 and lifting it with the rod 37 until the latter clears the shaft 8, and said cup can as readily be returned to place in said boiler. After the cup 9 has been removed, the break-water member 7 can be raised until the part 44 thereof clears the tube 4, and then taken from the boiler. To replace the member 7 in the boiler 3, position the part 45 against the inside of said boiler and the part 44 against the tube 4 and press said member down as far as it will go or until said part 44 comes to rest on the flange 48. With equal facility the boiler 3 can be removed from and replaced in the casing 1. Due to the provisions for separating the parts and members, as just described, it is possible and practicable to keep the same clean and in a sanitary condition. The upper compartment of the casing 1 can be wiped out or otherwise cleaned, when the boiler 3 is out of the way.

The rotation of the actuator, which rotation is imparted thereto from the shaft 8 through the medium of the rod 37 and connections, in the proper direction, causes water in the boiler 3 to be drawn upwardly by the screw 30, and to be expelled through the openings 33 in the cylinder 32 into the cup 9, such expulsion being due, of course, to centrifugal force. A certain amount of this water is also expelled through the openings 34 into the cup 9. The cup 9 rotates with the actuator and by centrifugal force expels through the openings 43 the liquid contents of said cup. The breakwater member 7 prevents the formation in the boiler 3 of a water column which would almost instantly be drawn up by the screw 30, and thus impair the successful operation of the device and even interfere therewith to a most serious extent. The water should be drawn up by the screw 30 and discharged into the cup 9 gradually, as will hereinafter more clearly appear.

The complete operation of the coffee extractor is described as follows:

The boiler 3 with the break-water member 7 in place is introduced into the casing 1, and the actuator is mounted on the shaft 8 and rotatably engaged therewith. The required amount of ground coffee is placed in the cup 9, when said cup is closed by means of the lid 10, and the boiler 3 is filled with cold water to the level indicated by the mark 29. The lid 2 is then placed over all. Next the electric current is turned on to the heater 6, and the latter heats the water in the boiler 3 and raises it to the boiling point. This takes but a comparatively short time, and when accomplished the motor 5 is set in motion. The motor 5, through the medium of its shaft 8, rapidly rotates the actuator and cup, with the result that the boiling water is drawn up from below by the screw 30 and discharged into the coffee in the cup 9. The mass in the cup 9 is thoroughly commingled and every particle of the coffee is subjected to the action of the hot water. Lastly, the infusion in the cup is discharged through the perforated sides thereof into the boiler. The boiling, circulating, commingling, and discharging operations are repeated as often and for as long a time as may be necessary to extract all of the desired ingredients from the coffee, as a rule two or three minutes being a sufficient length of time for the cooking process. At the end of the cooking process the infusion is in the boiler 3 beneath the cup 9 in readiness to be drawn off through the faucet 50 when and as required. The electric current is cut off from the motor at the end of the extracting operation, and such current is turned off from the heater 6 at the same time unless it be desired to prevent the contents of the boiler 3 from cooling, in a case where such contents is not drawn off within a reasonably short time after being finally precipitated from the cup 9 into the boiler 3.

It is necessary finally to take out the cup 9 and the other removable parts and members, for the purpose of clearing said cup of the coffee grounds and cleansing the same and said other parts and members, also the interior of the upper portion of the casing 1.

The lid 2 may be provided, if desired, with a glass dome 47 which serves as the handle of the lid and at the same time affords a view of the interior of the extractor.

More or less change in the shape, size, construction, and arrangement of some or all of the parts of this device may be made without departing from the spirit of my invention or exceeding the scope of what is claimed.

What I claim as my invention, and desire to secure by Letters Patent, is—

1. In a coffee extractor, an outer receptacle, an inner receptacle, an electric motor within said outer receptacle, said motor being provided with a shaft, an electric heater for said inner receptacle, also within said outer receptacle and an actuator and a coffee receptacle mounted on said shaft within said inner receptacle.

2. In a coffee extractor, a casing, a boiler receivable within said casing, an electric heater in said casing beneath said boiler, an electric motor in said casing beneath said heater, said motor having a shaft which extends into said boiler, and a hollow-walled actuator and a perforated coffee receptacle mounted on said shaft, said actuator having perforated sides.

3. In a coffee extractor, a casing, a boiler receivable in said casing, an electric heater in said casing beneath said boiler, an electric motor in said casing beneath said heater, said motor having a shaft which extends into said boiler, a break-water member in said boiler, and an actuator and a coffee receptacle mounted on said shaft within said boiler.

4. In a coffee extractor, a boiler for water, a receptacle for coffee, and an open-ended hollow-walled actuator having perforated sides, and means to rotate said actuator and receptacle, the former being adapted to convey water from said boiler to said receptacle.

5. In a coffee extractor, an actuator comprising a screw, and a cylinder outside of said screw, and having therein perforations at different points longitudinally between the top and bottom planes of the convolution of said screw.

6. In a coffee extractor, an actuator comprising a screw, and a cylinder outside of said screw, and having therein perforations at different points longitudinally between the top and bottom planes of the convolution of said screw, the spiral passage formed by said screw and cylinder opening through said perforations.

7. In a coffee extractor, an actuator comprising a screw, a closure at the top of said screw, and a perforated cylinder outside of said screw, the spiral passage formed by said screw and cylinder opening through the perforations in the latter, and said closure having perforations through which said passage also opens.

8. In a coffee extractor, an actuator comprising a screw, and a perforated cylinder outside of said screw, the bottom of said screw being below the bottom of said cylinder.

9. In a coffee extractor, an actuator comprising a screw, a closure for the top of said screw, and a cylinder outside of said screw, and having therein perforations at different points longitudinally between the top and bottom planes of the convolution of said screw, the bottom of the latter being below the bottom of said cylinder.

10. The combination, in a coffee extractor, with an actuator comprising a screw, a handle at the top of said screw, and a cylinder outside of said screw, and having therein perforations at different points longitudinally between the top and bottom planes of the convolution of said screw, of a perforated coffee cup secured to said actuator.

11. The combination, in a coffee extractor, with an actuator comprising a screw, a handle at the top of said screw, and a cylinder outside of said screw, and having therein perforations at different points longitudinally between the top and bottom planes of the convolution of said screw, of a perforated coffee cup having its bottom secured to said cylinder adjacent to the bottom thereof.

12. The combination, in a coffee extractor, with an actuator comprising a screw, a handle at the top of said screw, and a cylinder outside of said screw, and having therein perforations at different points longitudinally between the top and bottom planes of the convolution of said screw, the bottom of the latter being below the bottom of said cylinder, of a perforated coffee cup having its bottom secured to said cylinder adjacent to the bottom of the latter.

13. The combination, in a coffee extractor, with a casing, a boiler receivable in said casing, an electric heater in said casing beneath said boiler, and an electric motor in said casing beneath said heater, said motor having a shaft that extends into said boiler, of an actuator and coffee receptacle mounted on said shaft, and a break-water member in said boiler approximately radial to said shaft.

14. The combination, in a coffee extractor, with a casing, a boiler receivable in said casing, a heater in said casing beneath said boiler, and a motor in said casing beneath said heater, said motor having a shaft which extends into said boiler, and the latter being provided with a tube which surrounds that portion of said shaft which is in the same, of an actuator and a coffee receptacle mounted on said shaft, and a break-water member in said boiler, said member having a part to engage said tube and a part to engage the side of the boiler.

15. The combination, in a coffee extractor, with a casing, a boiler receivable in said casing, an electric heater in said casing beneath said boiler, an electric motor in said casing beneath said heater, said motor having a shaft which extends into said boiler, of an actuator and a coffee receptacle mounted on said shaft, and a break-water member in said boiler approximately radial to said shaft, said member having its bottom edge notched.

16. The combination, in a coffee extractor, with a casing, a boiler receivable in said casing, an electric heater in said casing beneath said boiler, and an electric motor in said casing beneath said heater, said motor having a shaft which extends into said boiler, and the latter being provided with a tube which surrounds that portion of said shaft that is in the same, of an actuator and a coffee receptacle mounted on said shaft, and a break-water member in said boiler, said member having a part to engage said tube and a part to engage the side of said boiler, and being recessed in the bottom edge.

17. The combination, in a coffee extractor, with a shaft, of an actuator comprising a hollow screw, a handle at the top of said screw, and a perforated cylinder outside of said screw, a rod depending from said handle into said screw and adapted to be rotatably connected with said shaft, and a perforated coffee receptacle secured to said actuator.

18. The combination, in a coffee extractor, with a shaft, of an actuator comprising a screw, a handle at the top of said screw, and a perforated cylinder outside of said screw, a rod rigidly attached to and depending from said handle and adapted to be rotatably connected with said shaft, a perforated coffee receptacle secured to said actuator, and a cover for said receptacle, said cover having an opening therein for the passage of said handle.

19. The combination, in a coffee extractor, with a shaft having a passage in the upper terminal thereof, and provided with a pin which extends into said passage, of an actuator comprising a hollow screw, a handle at the top of said screw, and a perforated cylinder outside of said screw, a rod rigidly attached to and depending from said handle into said screw, said rod being receivable in said passage and having a key-way to receive said pin, and a perforated coffee receptacle secured to said actuator.

20. A coffee extractor comprising a casing, a boiler receivable in said casing, an electric heater in said casing beneath said boiler, an electric motor in said casing beneath said boiler, said motor having a shaft that extends into said boiler, an actuator and a coffee receptacle rotatably connected with said shaft in said boiler, a lid for said receptacle, and a lid for said casing and boiler.

21. In a coffee extractor, a boiler, a perforated coffee receptacle, and rotary means to support and rotate said receptacle in said boiler, such means consisting in part of an actuator adapted to convey hot water from said boiler to the interior of said receptacle.

22. In a coffee extractor, a screw, a handle at one end of said screw, a perforated cylinder outside of said screw, and a perforated coffee receptacle surrounding said cylinder, such parts and members being rigidly connected and provided with means to support and rotatably connect them on and with a shaft.

23. In a coffee extractor, a screw, a handle at one end of said screw, a perforated cylinder outside of said screw, and a perforated coffee receptacle surrounding said cylinder, such parts and members being rigidly connected and provided with means whereby they may be mounted on and rotatably connected with a shaft, and disconnected and removed therefrom.

MAX H. RIECKMANN.

Witnesses:
C. C. WEST,
GEORGE W. FAIRFIELD.